United States Patent [19]
Loafman et al.

[11] Patent Number: 5,447,627
[45] Date of Patent: Sep. 5, 1995

[54] DUAL-FLOW FILTER ASSEMBLY WITH A CENTER-TUBE SEALING GROMMET

[75] Inventors: Christopher L. Loafman, Gastonia, N.C.; Timothy L. Memmer, Perrysburg, Ohio

[73] Assignee: Dana Corporation, Toledo, Ohio

[21] Appl. No.: 155,565

[22] Filed: Nov. 22, 1993

[51] Int. Cl.⁶ .......................................... B01D 27/14
[52] U.S. Cl. ..................... 210/316; 210/438; 210/440; 210/450; 210/DIG. 13; 210/DIG. 17
[58] Field of Search ......... 210/316, 438, 450, DIG. 13, 210/DIG. 17, 440

[56] References Cited

U.S. PATENT DOCUMENTS

| | | | |
|---|---|---|---|
| 4,738,776 | 4/1988 | Brown | 210/168 |
| 4,997,556 | 3/1991 | Yano et al. | 210/136 |
| 5,041,221 | 8/1991 | Drusi | 210/323.1 |
| 5,078,877 | 1/1992 | Cudaback et al. | 210/315 |
| 5,217,606 | 6/1993 | Ramponi et al. | 210/136 |

FOREIGN PATENT DOCUMENTS 0362554 4/1990 European Pat. Off.
1418394 12/1975 United Kingdom.

*Primary Examiner*—Matthew O. Savage
*Attorney, Agent, or Firm*—Millen, White, Zelano & Branigan

[57] ABSTRACT

A dual-flow lubricant filter assembly having a bypass filter element with a full-flow filter element stacked thereon includes a grommet disposed between the filter elements for isolating lubricant streams after the lubricant has passed through the filter elements. The grommet is molded of a resinous material and includes an external flange which is sandwiched between the bypass and full-flow filter elements in order to axially position the grommet. The grommet also includes an internal flange which seals with an unthreaded portion of a standpipe with which the filter assembly is coupled.

3 Claims, 1 Drawing Sheet

DUAL-FLOW FILTER ASSEMBLY WITH A CENTER-TUBE SEALING GROMMET

FIELD OF THE INVENTION

This invention relates to a dual-flow filter assembly for lubricating oil with a center tube sealing grommet. More particularly, the present invention relates to a dual-flow filter assembly for lubricating oil with a device which facilitates separation of lubricating oil flow through the filter assembly.

BACKGROUND ART

Diesel engines frequently utilize spin-on filters which have stacked filter elements wherein one filter element is a full-flow filter element and the other filter element is a bypass flow element. With such filters, two distinct flow paths are channeled through two stacked filter elements within a spin-on filter. The full-flow path removes large particles and supplies the system with lubricating oil while the bypass flow path provides a low efficiency loop which returns filtered lubricant to a storage sump. The resulting arrangement provides lubricating oil with an improved overall cleanliness.

In prior art approaches, separating the flow paths requires use of lathe-cut gaskets, O-rings, grommets, molded components, metal tubes with welded or press fit subassemblies, and unique end caps in order to provide sealing surfaces for separation of the full-flow and bypass flow paths. Generally, the molded components of these assemblies are configured so as to require mechanical support and centering assistance from specially designed end caps. In practice, tooling for two to three end cap configurations are necessary, each of which is useless in dissimilar applications. Moreover, the alignment of stacked filters during production is a relatively difficult task and utilizing solid center tubes with welded subassemblies are required to facilitate the design. These aspects of prior art filter assemblies result in relatively high material and labor costs, and in addition, keep the length of time required for production relatively high.

In view of these considerations, there is a need for an arrangement which utilizes standardized components such as standardized end caps, element supports and inner element structures. Moreover, there is a need for a construction which is self-centering, eliminating the need for unique end cap configurations, and there is a need for an arrangement which does not require mechanical support from a lower end cap. Solving these problems results in reduced labor costs and tooling costs and a reduction in the total number of inventoried parts required for each dual-flow lubricating filter assembly.

SUMMARY OF THE INVENTION

In view of the aforementioned considerations, it is a feature of the instant invention to provide a new and improved arrangement wherein a sealing grommet is provided to isolate flow paths which sealing grommet reduces the number of parts as well as the complexity of dual-flow filter assemblies for lubricating oil.

In view of this feature and other features, the present invention contemplates a sealing grommet for use in separating a full-flow oil path from a bypass flow oil path in a dual-flow filter assembly for lubricating oil mounted on a standpipe wherein an annular full-flow filter element is axially positioned with respect to an annular bypass flow filter element. The sealing grommet includes a substantially tubular body portion having first and second open ends. An exterior flange extends radially from the tubular body and is sandwiched between the full-flow and bypass flow filter elements in order to axially retain the grommet in place within the dual-flow and bypass flow filter elements and an interior annular flange forms a seal which provides a sealing engagement with the standpipe received within the filter assembly.

In another aspect, the invention is directed to a dual-flow filter assembly for lubricating oil including a housing having a closed first end and a second end enclosed by an end plate wherein the end plate includes a central threaded bore and a plurality of inlet openings disposed about the central open bore. The central open bore receives a standpipe having a threaded portion and an outboard smooth portion. Lubricating oil enters the housing through the inlet openings. An annular bypass filter is mounted within the housing proximate the end plate and an annular full-flow filter is mounted in axial alignment with the annular bypass filter. The filters are axially urged both together and toward the end plate of the housing by a spring applying an axial force thereto. A grommet is disposed within the annular filter elements. The grommet has a tubular body portion with an annular external flange received between the bypass filter element and full-flow filter element. The tubular body portion further has an internal annular flange in sealing engagement with the upper portion of the standpipe, whereby the grommet isolates lubricating oil flowing through the full-flow filter from lubricating oil flowing through the bypass filter.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
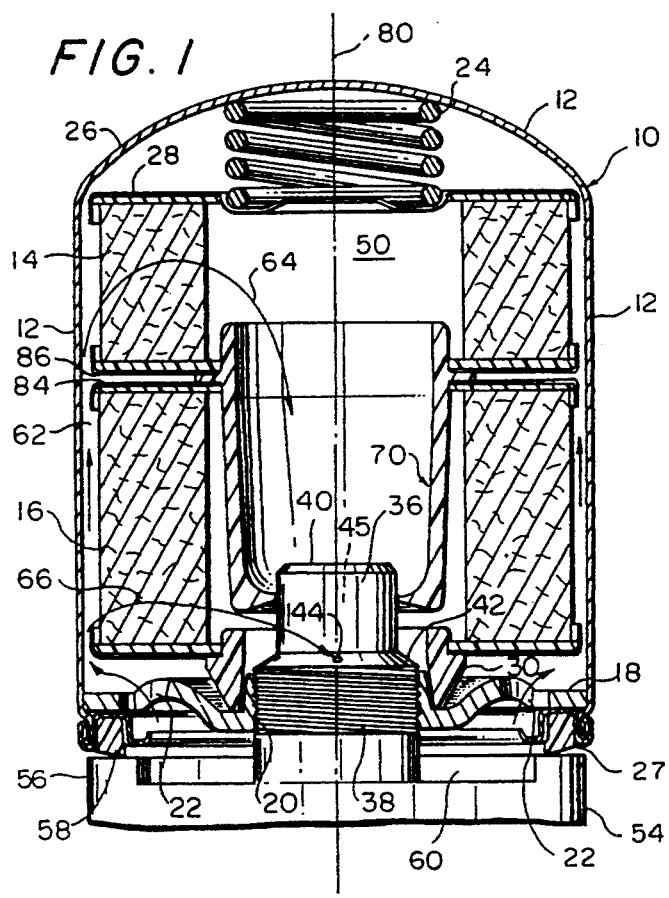
FIG. 1 is a side elevation illustrating a dual-flow filter assembly configured in accordance with the principles of the instant invention which utilizes a molded grommet to separate flow paths within a hollow core of the filter assembly.

Referring now to FIG. 1, there is shown a dual-flow filter assembly 10 for lubricating oil in which a housing 12 retains a full-flow first filter 14 and a bypass flow second filter 16. The housing includes a base 18 fixed thereto which has an internally threaded, center port 20 therein. The base 18 includes a plurality of inlet openings 22 which are spaced around the internally threaded, center port 20.

A coil spring 24 is disposed between the end 26 of the housing 12 and a metal end plate 28 disposed at one end of the full-flow filter 14. The spring 24 urges the full-flow filter 14 against the bypass flow filter 16 which is supported on a molded plastic collar 30 surrounding the internally threaded, center port 20. The bypass flow filter 16 rests against the end plate 18 in which the internally threaded, center port 20 is positioned.

In use, the filter assembly 10 is spun onto a standpipe 36 which has a threaded lower portion 38 of a first diameter and an unthreaded upper portion 40 of a diameter less than the bottom portion. A frustoconical shelf 42 joins the upper portion 40 to the lower portion 38. The shelf includes a number of bores 44 therein which communicate with the bypass flow path in a conventional well known manner. Inboard of the bypass flow path accessed by the bores 44, is a central flow path 45 which communicates with the central cavity 50 of the dual-flow filter assembly 10.

The standpipe 36 projects from a mounting adapter 54 which has an annular rim 56 that seals against the bottom of the housing 12 with a seal 58. Oil enters an annular space 60 from an oil pump (not shown) and flows through the plurality of inlet openings 22 in the base to a space 62 between the housing 12 and the bypass and full-flow filter elements 16 and 14, respectively. Oil passing through the full-flow filter element 14 follows the path generally illustrated by arrow 64, while oil following the bypass flow path follows a direction generally illustrated by the arrow 66. It is necessary to keep the bypass flow path 66 isolated from the full-flow path 64.

Figure 2:
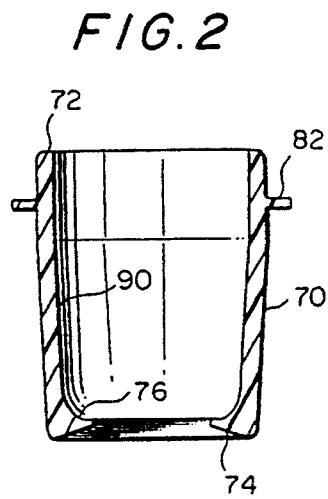
FIG. 2 is a side elevation of the grommet of FIG. 1.
Figure 3:
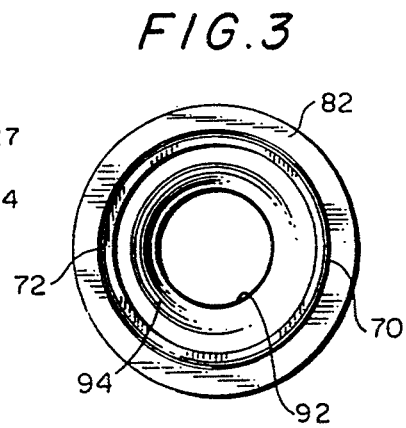
FIG. 3 is a top view of the grommet shown in FIG. 2.
Figure 4:
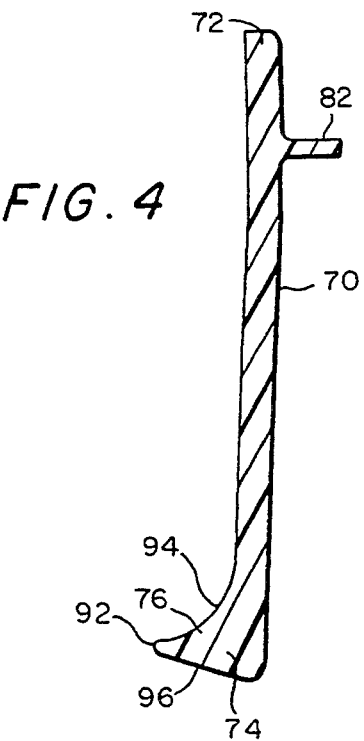
FIG. 4 is an enlarged elevation through the wall of the grommet of FIGS. 1–3.

In accordance with the principles of the instant invention, separation of the flow paths 64 and 66 is accomplished by a grommet 70 shown installed in FIG. 1 and shown in separate views in FIGS. 2–4. The grommet 70 is substantially tube-shaped with a first end 72 and a second end 74. The first end opens in the central cavity 50 defining the hollow central core of the full-flow filter 14, while the second end terminates with an internal flange 76 which forms a sealing engagement with the outer, unthreaded surface of the upper portion 40 of standpipe 38. In order to properly position the grommet 70 in a fixed position with respect to the common axis 80 of the filter assembly 10, an external annular flange 82 is provided. The external annular flange 82 is sandwiched between the top 84 of bypass filter element 16 and the bottom 86 of the full-flow path filter element 14. In addition to axially positioning the grommet 70, the external flange 82 helps seal the flow path 64 from the flow path 66. The grommet 70 has a substantially cylindrical wall 90 which cooperates with the internal flange 76 and the external flange 82 to provide a dam between the full-flow and bypass flow paths 64 and 66.

Referring now more specifically to FIG. 4, it is seen that the grommet 70 has a specific configuration wherein the inner annular flange 76 is tapered toward a generally pointed wiping surface 92 which wipes on the cylindrical unthreaded surface 40 of the standpipe 36. In order to provide enhanced sealing as the pressure generated by oil flowing in a full-flow path presses against the internal flange 74, the internal flange has an internal curved surface 94 and a convex, frustoconical outer surface 96. While lubricating oil following the full-flow path 64 tends to expand the grommet 70 outwardly, lubricating oil following the bypass flow path applies pressure to the outer surface of the grommet as well as to the surface 96, tending to hold the grommet in sealing engagement.

Preferably, the grommet 60 is an item molded from a conventional, resilient resinous material such as polypropylene which is sufficiently soft to provide a good seal while not being subject to deformation due to differential oil pressures or fluctuations in oil pressure.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A dual-flow lubricant filter assembly comprising:
   a housing having a closed first end and a second end enclosed by an end plate wherein the end plate includes a central threaded bore and a plurality of inlet openings disposed about the central open bore; wherein the central open bore receives a standpipe having a threaded portion and an outboard smooth portion, and wherein lubricating oil enters the housing through the inlet openings;
   an annular bypass filter mounted within the housing proximate the end plate and an annular full-flow filter mounted in axial alignment with the annular bypass filter between the closed first end of the housing and the annular bypass filter; and the filters being axially urged together and toward the end plate of the housing by a spring applying an axial force thereto;
   a grommet disposed within the annular filter elements, the grommet having a tubular body portion with an annular external flange received between the bypass filter element and full-flow filter element, the tubular body portion further having an internal annular flange in sealing engagement with the outboard smooth portion of the standpipe, whereby the grommet isolates lubricating oil flowing through the full-flow filter from lubricating oil flowing through the bypass filter; and
   a collar disposed around the threaded bore, the collar supporting the bypass filter element and being in axial spaced relation to the grommet.

2. The assembly of claim 1, wherein the grommet is made of a resinous material.

3. The assembly of claim 2, wherein the internal flange is at one end of the tubular body and the external flange is proximate the other end of the tubular body.

* * * * *